United States Patent
Noro

(10) Patent No.: US 8,782,303 B2
(45) Date of Patent: Jul. 15, 2014

(54) INFORMATION PROCESSING APPARATUS AND CONTROL METHOD

(71) Applicant: Fujitsu Limited, Kawasaki (JP)

(72) Inventor: Masaaki Noro, Kawasaki (JP)

(73) Assignee: Fujitsu Limited, Kawaski-shi (JP)

( * ) Notice: Subject to any disclaimer, the term of this patent is extended or adjusted under 35 U.S.C. 154(b) by 0 days.

(21) Appl. No.: 13/792,370

(22) Filed: Mar. 11, 2013

(65) Prior Publication Data

US 2013/0262716 A1 Oct. 3, 2013

(30) Foreign Application Priority Data

Mar. 28, 2012 (JP) ................. 2012-075077

(51) Int. Cl.
*G06F 13/14* (2006.01)
*G06F 13/364* (2006.01)

(52) U.S. Cl.
CPC .................... *G06F 13/364* (2013.01)
USPC .................. 710/36; 710/17; 710/62

(58) Field of Classification Search
None
See application file for complete search history.

(56) References Cited

U.S. PATENT DOCUMENTS

| 8,286,221 | B2* | 10/2012 | Muller et al. ............ 726/2 |
| 8,573,485 | B2* | 11/2013 | Yoneda et al. ............ 235/380 |
| 2003/0135769 | A1 | 7/2003 | Loughran |
| 2007/0209038 | A1* | 9/2007 | Fuchs et al. ............ 719/313 |
| 2007/0235537 | A1* | 10/2007 | Yoneda et al. ............ 235/435 |
| 2008/0139116 | A1* | 6/2008 | Balgard et al. ............ 455/41.2 |
| 2012/0131501 | A1* | 5/2012 | Lazaridis et al. ............ 715/804 |
| 2012/0159578 | A1* | 6/2012 | Chawla et al. ............ 726/4 |
| 2012/0185597 | A1* | 7/2012 | Luna ............ 709/225 |
| 2013/0055347 | A1* | 2/2013 | Chawla et al. ............ 726/3 |

FOREIGN PATENT DOCUMENTS

| JP | 2004-530976 | 10/2004 |
| JP | 2010-56700 | 3/2010 |
| WO | WO 02/079957 A2 | 10/2002 |

* cited by examiner

*Primary Examiner* — Cheng-Yuan Tseng
(74) *Attorney, Agent, or Firm* — Oblon, Spivak, McClelland, Maier & Neustadt, L.L.P.

(57) ABSTRACT

An information processing apparatus includes a memory and a processor coupled to the memory. The processor is configured to execute a process including acquiring control information of a first application program of which execution result is displayed, extracting a dependency relationship between the first application program and a second application program on a basis of the control information, and determining whether an access request for a device from the second application program is granted on a basis of the dependency relationship.

12 Claims, 18 Drawing Sheets

| REMAINING BATTERY CAPACITY b | ACCESS RESTRICTED DEVICE |
|---|---|
| b≧40 | NONEXISTENCE |
| 40>b≧30 | Wifi |
| 30>b≧20 | GPS,Wifi |
| 20>b | GPS,Wifi,SENSOR |

INFORMATION PROCESSING APPARATUS AND CONTROL METHOD

CROSS-REFERENCE TO RELATED APPLICATIONS

This application is based upon and claims the benefit of priority of the prior Japanese Patent Application No. 2012-75077, filed on Mar. 28, 2012, the entire contents of which are incorporated herein by reference.

FIELD

The embodiments discussed herein are related to an information processing apparatus, a control method, and a storage medium that stores a control program.

BACKGROUND

When a peripheral device such as a wireless communication device or Global Positioning System (GPS) device is used in various portable terminal devices such as a cellular phone, an overall power consumption drastically increases in the portal terminal devices. Therefore, there is a technique where the operation of the peripheral device is deactivated to extend the battery life when, for example, the remaining capacity of the battery is reduced.

However, when the peripheral device is completely deactivated in a portable terminal device, there may be an application that cannot be used in the portable terminal device. For example, when the GPS or the Wi-Fi is deactivated, the portable terminal device may not be able to obtain the high-precision positional information. As a result, an application that uses the positional information such as, for example, a navigation system, becomes unavailable. In order to overcome the drawback, there is also a technique where the application running in the background is forcibly ended, rather than the peripheral device is ended, to reduce the power consumption. Even in this case, for example, when a schedule table application is activated to be executed in the foreground in order to confirm a schedule at a destination while navigating, the navigation application running in the background is forcibly ended to stop the navigation, thereby reducing the user convenience.

When a peripheral device is turned ON while an application running in the foreground of a portable terminal device is accessing the peripheral device, another irrelevant application running in the background at the same time may also be able to use the peripheral device. As a result, the battery consumption increases.

If a peripheral device that has a high power consumption is turned OFF or an application that has a high power consumption is forcibly ended uniformly when the remaining capacity of a battery becomes lower than a predetermined amount in order to increase the battery life of a portable terminal device, there is a concern that an application that a user wants to use may not be able to use the peripheral device.

The followings are reference documents.
[Document 1] Japanese National Publication of International Patent Application No 2004-530976
[Document 2] Japanese Laid-Open Patent Publication No. 2010-056700

SUMMARY

According to an aspect of the embodiments, an information processing apparatus includes a memory and a processor coupled to the memory. The processor is configured to execute a process including acquiring control information of a first application program of which execution result is displayed, extracting a dependency relationship between the first application program and a second application program on a basis of the control information, and determining whether an access request for a device from the second application program is granted on a basis of the dependency relationship.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a view illustrating an access restricted target table.

DESCRIPTION OF EMBODIMENTS

Hereinafter, an information processing apparatus according to exemplary embodiments of the present disclosure will be described.

First Exemplary Embodiment

Figure 1:
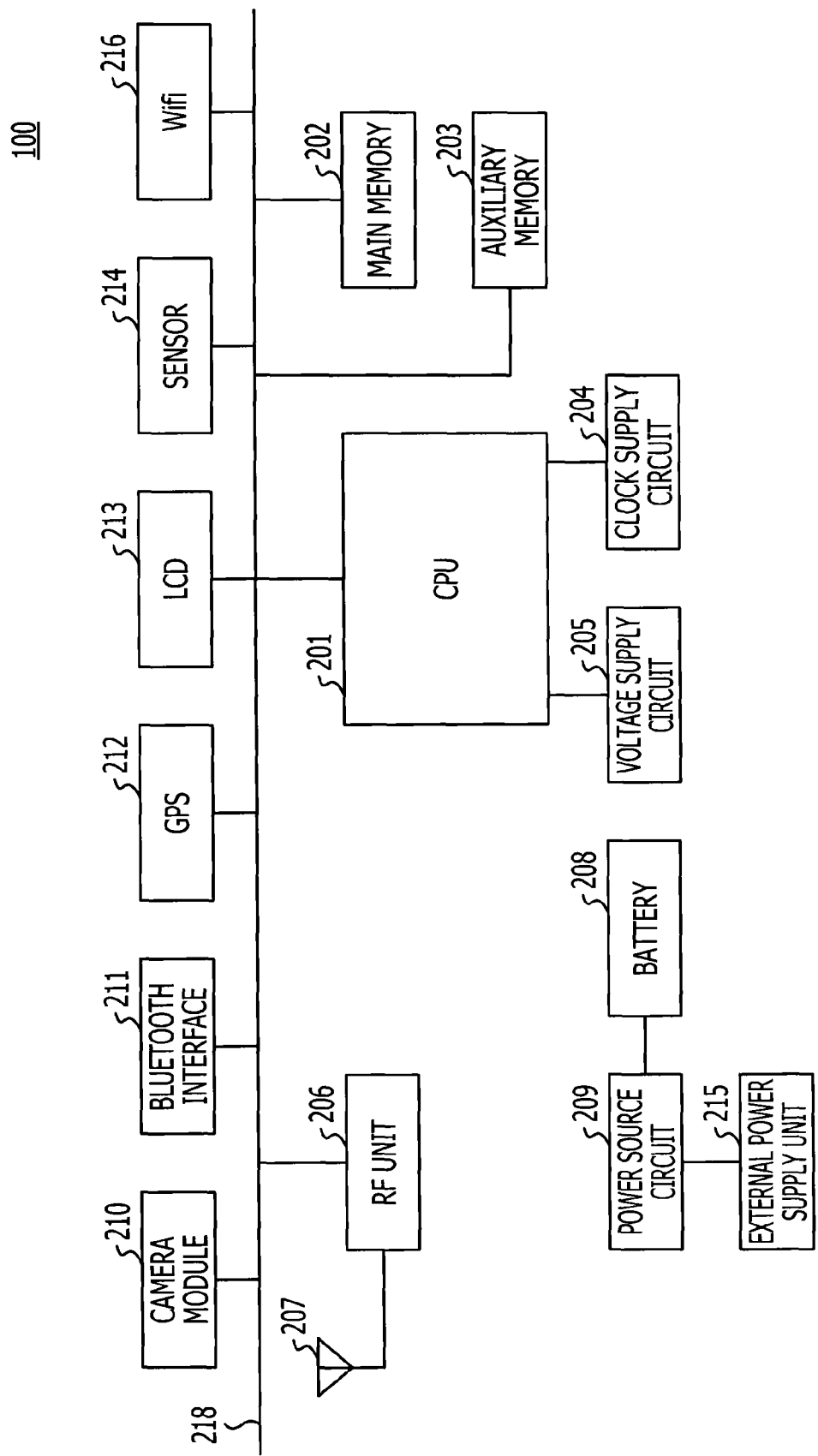
FIG. 1 is a view illustrating the hardware configuration of an information processing apparatus according to an embodiment of the present disclosure.

FIG. 1 is a view illustrating the hardware configuration of an information processing apparatus according to the exemplary embodiment. An information processing apparatus 100 illustrated in FIG. 1 is a portable terminal device such as, for example, a smart phone or a tablet PC.

The information processing apparatus 100 includes, as hardware modules, a CPU 201, a main memory 202, an auxiliary memory 203, a clock supply circuit 204, a voltage supply circuit 205, an RF (radio frequency) unit 206, an antenna 207, and a battery 208. The information processing apparatus 100 further includes, as hardware modules, a power source circuit 209, a camera module 210, a Bluetooth interface 211, a GPS module 212, an LCD (liquid crystal display) 213, a sensor 214, a Wi-Fi module 216, and an external power supply unit 215. The respective hardware modules are connected with each other via, for example, a bus 218.

The CPU 201 is responsible for an overall controlling the entire information processing apparatus 100. The CPU 201 is operated by a clock signal supplied from the clock supply circuit 204 and a voltage supplied from the voltage supply circuit 205. The CPU 201 stops its operation completely when a soft processing is not needed and goes into a sleep state until there is an external interrupt, thereby reducing power consumption. In the meantime, the CPU 201 may include any number of cores, such as, for example, a quad-core CPU.

The main memory 202 is such as a random access memory (RAM). The main memory is used for a working storage area of the CPU 201.

The auxiliary memory 203 is a non-volatile memory such as, for example, a hard disk or a flash memory. Various programs that operate the information processing apparatus 100 are stored in the auxiliary memory 203. The programs stored in the auxiliary memory 203 are loaded to the main memory 202 to be executed by the CPU 201. Accordingly, various programs to be described below are executed in the information processing apparatus 100. Additionally, various application programs to be described below are also stored in the auxiliary memory 203. The application programs stored in the auxiliary memory 203 are loaded to the main memory 202 to be executed by the CPU 201.

The clock supply circuit 204 supplies the CPU 201 with clock signals having a variable frequency. The clock supply circuit 204 may be implemented with, for example, a real time clock (RTC) along with a crystal oscillator that oscillates a clock signal. The voltage supply circuit 205 supplies a variable voltage to the CPU 201 using the power supplied from the power source circuit 209. The voltage supply circuit 205 may be implemented with, for example, a voltage detector and a voltage regulator.

The RF unit 206 has a function of a transmitter that transmits a high frequency signal from the antenna 207 to other wireless communication devices under the control of the CPU 201. The RF unit 206 also has a function of a receiver that converts the high frequency signal received by the antenna 207 into a baseband signal to output the baseband signal to the CPU 201.

The battery 208 supplies electrical power to the power source circuit 209. The battery 208 may be implemented with, for example, a lithium-ion battery and a battery protection IC. The power source circuit 209 supplies the power supplied from the battery 208 to the respective hardware modules of the information processing apparatus 100 via a power source line which is not illustrated. When an external power source is connected to the external power supply unit 215, the power source circuit 209 may supply the power supplied from the external power supply unit 215 to the respective hardware modules of the information processing apparatus 100. The power source circuit 209 may be implemented with, for example, a switching regulator and a voltage regulator.

The camera module 210 photographs a subject to acquire an image data under the control of the CPU 201. The Bluetooth interface 211 is a wireless communication interface that enables other communication devices to communicate with each other wirelessly via the Bluetooth (registered trademark) under the control of the CPU 201. Other than the Bluetooth interface 211, the information processing apparatus 100 may include a wireless communication interface such as a wireless LAN.

Under the control of the CPU 201, the GPS module 212 receives electromagnetic waves transmitted from a satellite to acquire positional information that indicate a current position of the information processing apparatus 100 on earth.

The LCD 213 is an image display device that displays an image for a user under the control of the CPU 201. The LCD 213 may be a touch panel which also has a position input function such as a touch pad.

The sensor 214 acquires information that indicates the respective internal conditions of the information processing apparatus 100 under the control of the CPU 201. The sensor 214 may include various sensors such as, for example, an acceleration sensor, a gyro sensor, an illuminance sensor, a geomagnetic sensor, an inclination sensor, a pressure sensor, a proximity sensor, and a temperature sensor. The Wi-Fi module 216 is a communication unit that wirelessly communicates with other devices. The CPU 201 acquires positional information indicating the current position of the information processing apparatus 100 using the Wi-Fi module 216.

Figure 2:
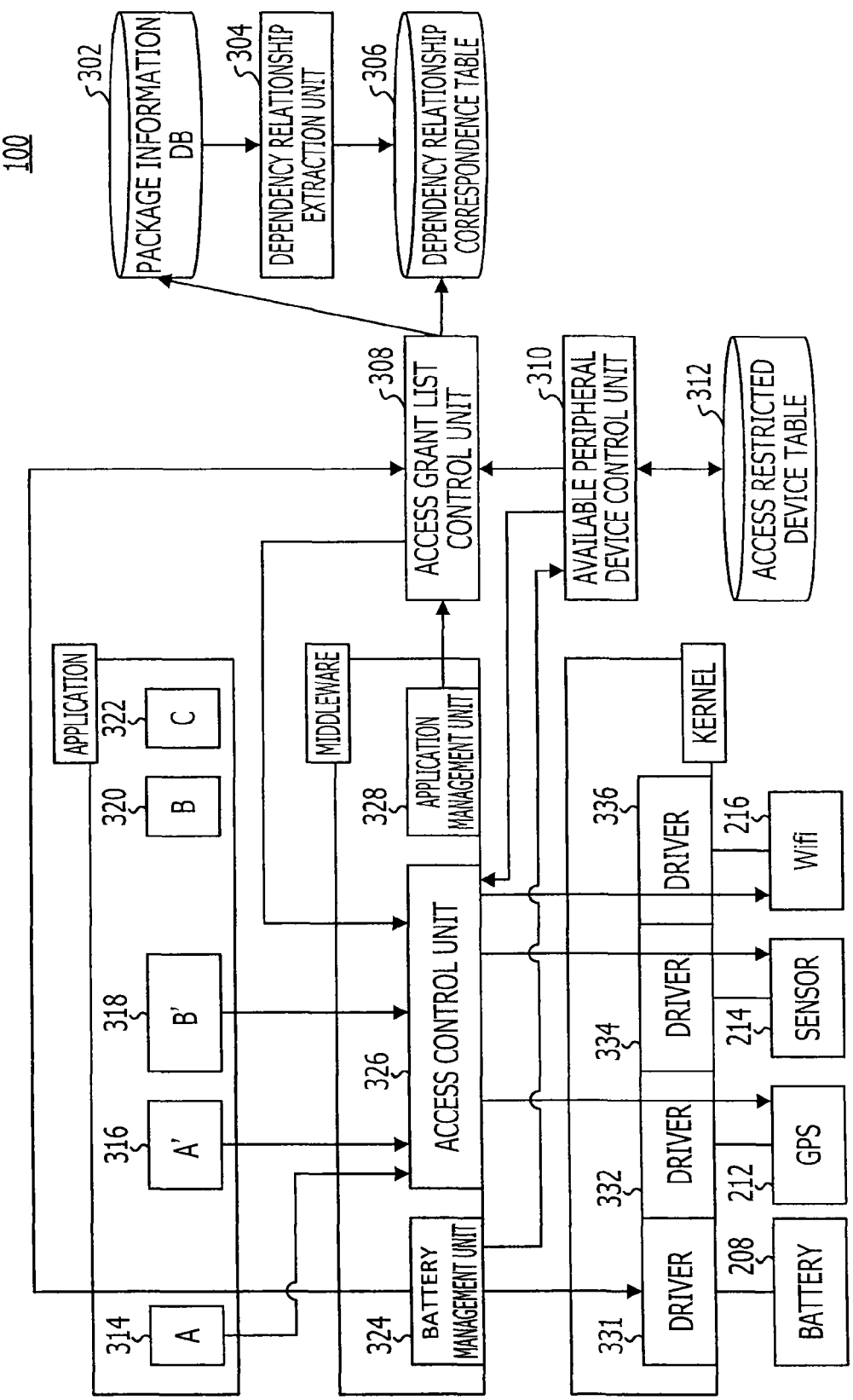
FIG. 2 is a first view illustrating the information processing apparatus.

FIG. 2 is a view illustrating an information processing apparatus according to the present exemplary embodiment. The information processing apparatus 100 includes a package information DB 302, a dependency relationship extraction unit 304, a dependency relationship correspondence table 306, an access grant list control unit 308, an available peripheral device control unit 310, an access restricted device table 312, an application A 314, an application A' 316, an application B' 318, an application B 320, an application C 322, a battery management unit 324, an access control unit 326, an application management unit 328, drivers 331, 332, 334, 336, the battery 208, the GPS module 212, the sensor 214 and the Wi-Fi module 216. Furthermore, an "application" refers to a specific function realized with "an application program" executed by the CPU 201 in the present exemplary embodiment. For example, the application A 314 refers to a specific function realized with the application program A executed by the CPU 201.

Figure 3:
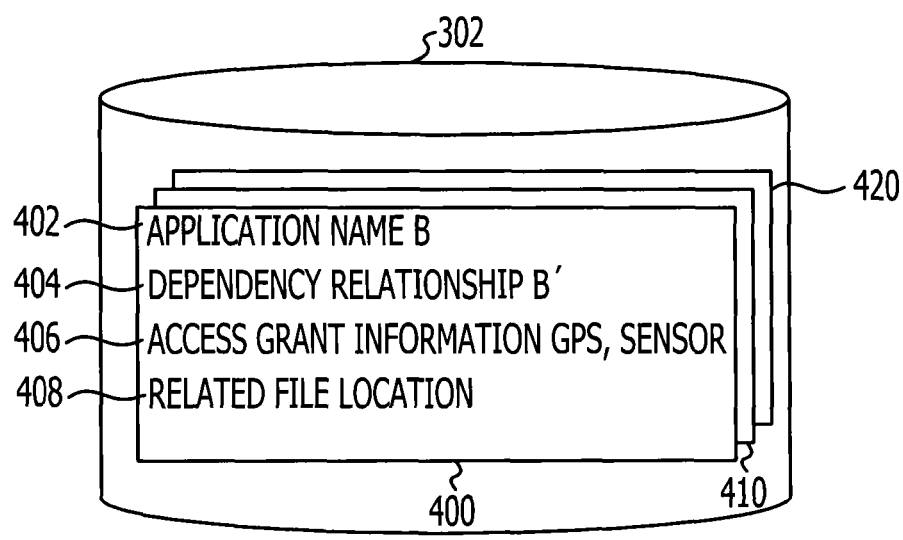
FIG. 3 is a first view illustrating a package information database (DB).

FIG. 3 is a view illustrating a package information DB. A plurality of package information are stored in the package information DB 302. The package information serving as control information is included in an application program. The package information DB 302 stores, for example, package information 400, 410, 420 in the present exemplary embodiment. The package information 400 associates an application name 402, a dependency relationship 404, access grant information 406 and a related file location 408 to be recorded in association with each other. The application name 402 represents the name of an application program. The dependency relationship 404 represents the name of an application program that depends on another_application program represented by the application name 402. The access grant information 406 represents the name of a device to which an application is granted access. The related file location 408 represents a location of a file related to the application program represented by the application name 402. The package information 400 represents that the application B has a dependency relationship with application B' and the accessible peripheral devices by the application B are the GPS module 21 and the sensor 214. The application name 402, the dependency relationship 404, the access grant information 406 and the related file location 408 are also recorded in association with one another in the package information 410, 420.

Figure 4:
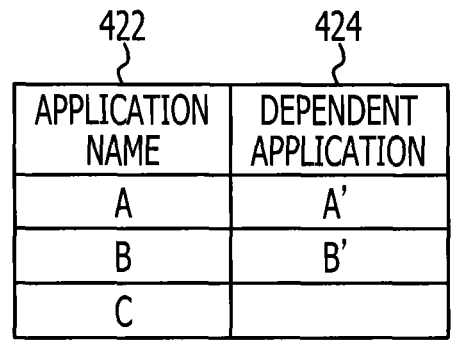
FIG. 4 is a view illustrating a dependency relationship correspondence table.

FIG. 4 is a view illustrating the dependency relationship correspondence table 306. The dependency relationship extraction unit 304 refers to the package information DB 302 to generate the dependency relationship correspondence table 306. The dependency relationship correspondence table 306 corresponds the application name 422 and the dependent application 424 to record in association with each other. The application name 422 represents the name of an application program. The dependent application 424 represents the name of an application program that depends on the application program represented by the application name 422. The dependency relationship correspondence table 306 represents, for example, that the application A and the application A' have a dependency relationship with each other. The application A is, for example, intended to use the positional information, and application A' that depends on the application A acquires the positional information from the GPS module 212, and the application A conducts a process using the positional information acquired by the application A'.

Figure 5:
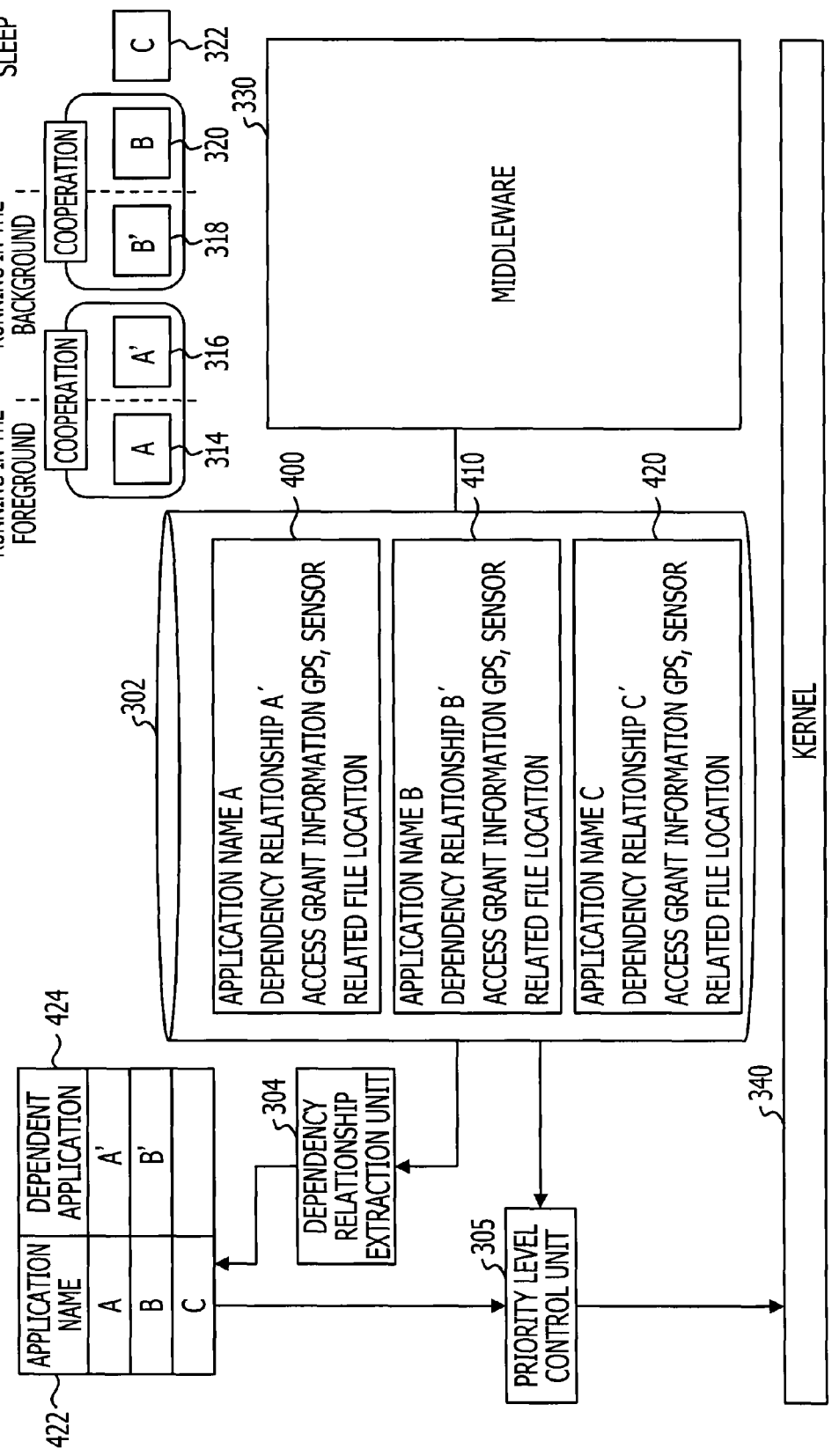
FIG. 5 is a view illustrating the process of a dependency relationship extraction unit.

FIG. 5 is a view illustrating the process of a dependency relationship extraction unit. For example, in a smart phone, an application program for manipulating a screen and a service program operated in the background are enclosed in a single package, and the plurality of programs are associated with each other to be operated. In this case, the information regarding the kind of programs enclosed in the package are described in the package information enclosed in the package and thus, the package information may be interpreted to obtain the information regarding the programs. Therefore, the dependency relationship extraction unit 304 utilizes the package information to extract the dependency relationship between the application programs.

Further, in a multi-window system such as a PC, there is a case where a user runs a plurality of application programs simultaneously that have nothing to do with each other. For example, the user may generate a document while viewing a moving image at the same time. However, a single window system such as a smart phone displays only a single screen where a single application program is executed at a time. As a result, an application being intentionally used by the user at a specific time corresponds to an application displayed on a screen in the foreground, and an application program of which the execution result is displayed in the foreground can be specified. These information may be aggregated to generate a list of application programs or services that have been granted an access to a peripheral device at a certain time. The generated list may be notified to the access control unit 326 mounted in the smart phone, thereby allowing the application being used by the user and other related services or applications to use the peripheral device.

In the present exemplary embodiment, it is assumed that the application A 314 is running in the foreground, and the application A' 316 and the application B' 318 are running in the background. Further, the application B 320 and the application C 322 are assumed to be in a sleep state. In the meantime, an application that is running in the foreground here refers to an application of which the execution result is displayed in the LCD 213, among the plurality of applications that are running. Furthermore, an application running in the background refers to an application other than the application of which the execution result is displayed in the LCD 213, among the plurality of applications that are running.

The dependency relationship correspondence extraction unit 304 retrieves the package information 400 stored in the package information DB 302. In the present exemplary embodiment, it is assumed that the package information 400, 410, 420 are stored in the package information DB 302.

The package information 400 represents information about the application A 314. The package information 400 represents that the application 314 has a dependency relationship with the application A' 316, and the devices to which the application 314 is granted access are the GPS module 212 and the sensor 214. The package information 410 represents information about the application B' 318. The package information 410 represents that the application B' 318 has a dependency relationship with the application B 320, and the GPS module 212 and the sensor 214 are granting accesses to the application B' 318. The package information 420 represents information about the application C 322. The package information 420 represents that no application has a dependency relationship with the application C 322, and the Wi-Fi module 216 is granting access to the application C 322.

The dependency relationship extraction unit 304 refers to the package information 400, 410, 420 to generate the dependency relationship correspondence table 306. The dependency relationship extraction unit 304 acquires information from the package information 400 that the application A' 316 depends on the application A 314, and associates the application A 314 and the application A' 316 with the application name 422 and dependent application 424 of the dependency relationship correspondence table 306, respectively, for a recording. The dependency relationship extraction unit 304 acquires information from the information 410 that the application B 320 depends on the application B' 318, and corresponds the application B 320 and the application B' 318 to the application name 422 and dependent application 424 of the dependency relationship correspondence table 306, respectively, for a recording. The dependency extraction unit 304 acquires information from the information 420 that an application that depends on the application C 322 does not exist and records the application C 322 on the application name 422 of the dependency relationship correspondence table 3.

A middleware 330 acquires information about a running application program and notifies a priority level control unit 305 of the acquired information. The middleware 330 detects that the application A 314 is running in the foreground. The middleware 330 detects that the application A' 316 and the application B' 318 are running in the background. Furthermore, the middleware 330 detects that the application B 320 and the application C 322 are in a sleep state. The middleware 330 notifies the priority level control unit 305 that the application A 314 is running in the foreground, the application A' 316 and the application B' 318 are running in the background, and the application B 320 and the application C 322 are in a sleep state.

The priority level control unit 305 acquires information about a running application program from the middleware 330. The priority level control unit 305 refers to the dependency relationship correspondence table 306 to instruct a kernel 340 to increase the priority level of the application program running in the foreground and the application program which depends on the application program running in the foreground by the CPU 201. Further, for example, when the application B' 318 is executed to run in the background, the priority level control unit 305 instructs the kernel 340 to increase the priority level of the application B' 318 and the application 320 which depends on the application B' 318. The kernel 340 receives instructions from the priority level control unit 305 to execute the respective application programs.

The battery management unit 324 checks for the remaining capacity of the battery 208 through the driver 331. The driver 331 controls the battery 208. Similarly, the drivers 332, 334, 334 control the GPS module 212, the sensor 214, and the Wi-Fi module 216, respectively.

When it is detected that the remaining capacity of the battery 208 becomes a threshold or less, the battery management unit 324 notifies the access grant list control unit 308 and the available peripheral device control unit 310 of the decrease of the remaining capacity of the battery. When it is detected that the remaining capacity of the battery 208 becomes higher than the threshold, the battery management unit 324 also notifies the access grant list control unit 308 and the available peripheral device control unit 310 of the recovery of the remaining capacity of the battery.

Upon receiving a notification indicating that the remaining capacity of the battery has been reduced, the available peripheral device control unit 310 refers to the access restricted device table 312 to acquire information about a device for which an access may be restricted according to the remaining capacity of the battery. The available peripheral device control unit 310 notifies the access control unit 326 of the information regarding the access restricted peripheral device, based on the acquired information about the access restricted device.

FIG. 6 is a view illustrating the access restricted device table 312. The access restricted device table 312 associates the remaining battery capacity 412 with an access restricted target device 414 for recording. The remaining battery capacity 412 represents a remaining capacity of the battery 208 as a percentage. The access restricted target device 414 represents the name of an access restricted device. In the access restricted device table 312, when the remaining capacity of the battery is 40% or more, no device would be restricted. When the remaining capacity of the battery is 30% or more and less than 40%, the Wi-Fi module 216 would be restricted. When the remaining capacity of the battery is equal to or more than 20% and less than 30%, the GPS module 212 and the Wi-Fi module 216 would be restricted. When the remaining capacity of the battery is less than 20%, the GPS module 212, the Wi-Fi module 216 and the sensor 214 would be restricted. In the exemplary embodiment, it is assumed that the electrical power is consumed with an order of the Wi-Fi module 216, the GPS module 212 and the sensor 214 where the Wi-Fi module 216 consumes the most power.

The Wi-Fi module 216 is a communication unit which wirelessly communicates with other devices. A device that accompanies a wireless transmission like the Wi-Fi module 216 consumes more power than other devices that do not accompany the wireless transmission.

Further, the CPU 201 executes a process of calculating positional information based on information transmitted from the plurality of satellites received by the GPS module 212. In particular, in order to acquire initial positional information, the CPU 201 executes a process for searching the satellites that transmit information and a process for calculating positional information in order to acquire information from the satellites each of which transmits information with different frequencies. In general, the CPU 201 controls the GPS module 212 to perform a satellite search process and the positional information is calculated based on information transmitted from the plurality of satellites and received by the GPS module 212. Therefore, the power consumption increases in a device that utilizes the GPS module 212 because of the increased processing load by the CPU 216, although the power consumption is not the level of the Wi-Fi 216 that accompanies a wireless transmission.

Further, an acceleration sensor is assumed as an example of the sensor 214 in the present exemplary embodiment. Since the acceleration sensor simply acquires and stores acceleration information, the power consumption at the acceleration sensor is not as big as the Wi-Fi module 216 that accompanies the wireless transmission during communication or the GPS module 212 that has an increased processing load by the CPU 201.

The application management unit 328 detects an application program running in the foreground by the CPU 201 and notifies the access grant list control unit 308 of the detected application program name.

The access grant list control unit 308 refers to the access restricted device table 312 based on the name of the application program that is running in the foreground which is notified from the application management unit 328, and acquires the name of an application that depends on the application program running in the foreground. The access grant list control unit 308 notifies the access control unit 326 of an access grant list based on the acquired application program name.

The access control unit 326 receives an access request from a running application. Further, the access control unit 326 receives a notification from the available peripheral device control unit 310 indicating the access restricted peripheral device and receives an access grant list from the access grant list control unit 308. The access control unit 326 grants or denies an access request from the running application based on the received notification indicating the access restricted peripheral device and the access grant list.

Figure 7:
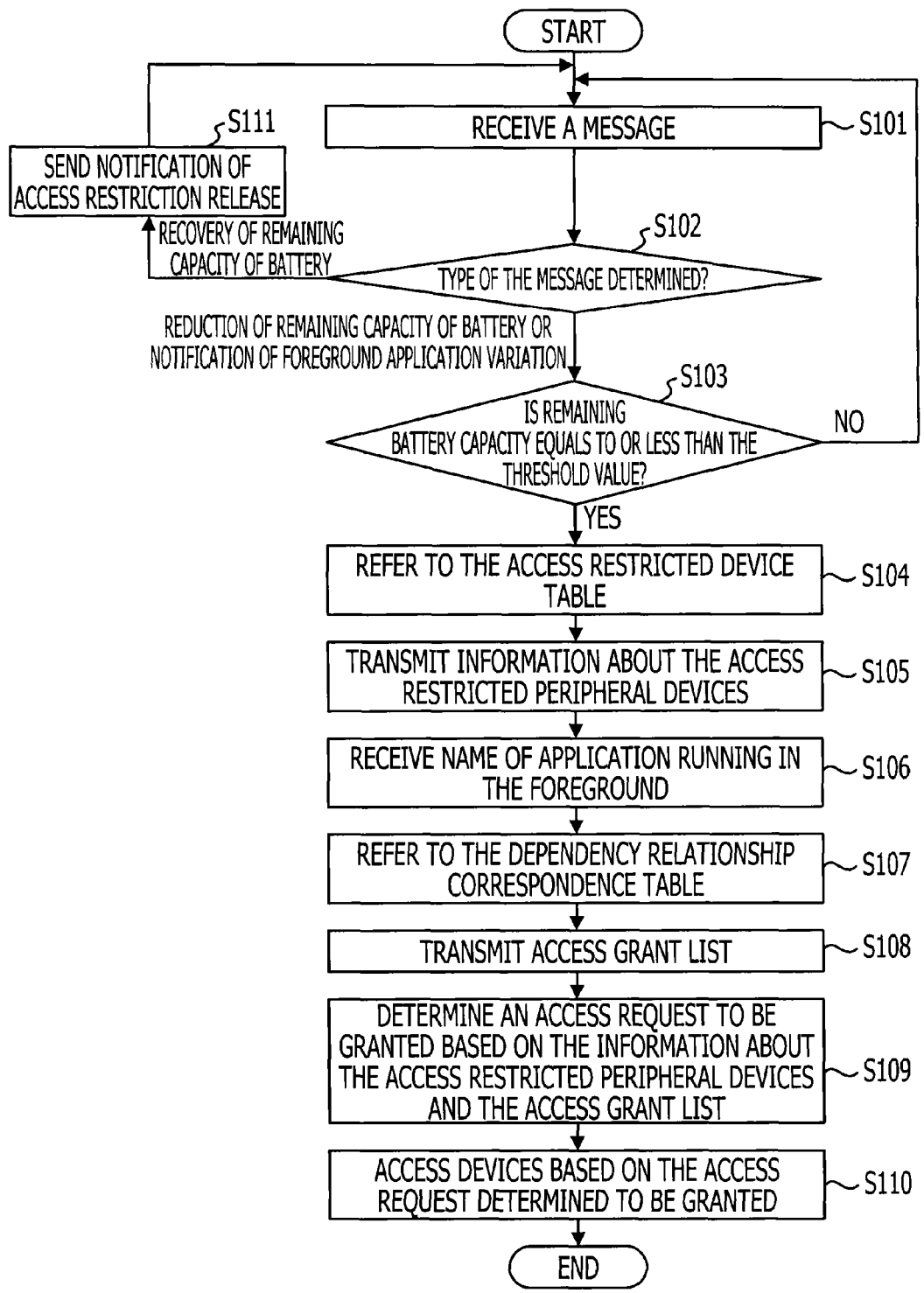
FIG. 7 is a first flowchart illustrating the process of the information processing apparatus.

FIG. 7 is a flowchart illustrating the process of the information processing apparatus.

At step S101, the access grant list control unit 308 receives a message. The access grant list control unit 308 then proceeds with the process of S102.

At step S102, the access grant list control unit 308 determines the type of the received message. When it is determined that the type of the received message is a notification regarding the recovery of the remaining capacity of the battery, the access grant list control unit 308 proceeds with the process of S111. However, when it is determined that the type of the received message is either a notification regarding the reduction of the remaining capacity of the battery or a notification of a foreground application variation sent from the application management unit 328, the access grant list control unit 308 proceeds with the process of S103.

At step S103, the access grant list control unit 308 determines whether the remaining capacity of the battery is the threshold value or less using a battery management unit 328. When it is determined that the remaining capacity of the battery is a threshold value or less, the access grant list control unit 308 proceeds with the process of S104. However, when it is determined that the remaining capacity of the battery is more than the threshold value, the access grant list control unit 308 returns to the process of S101.

At step S104, upon receiving a notification regarding the reduction of the remaining capacity of the battery and the remaining capacity of the battery 208 from a battery management unit 324, the available peripheral device control unit 310 refers to the access restricted device table 312 based on the percentage of the remaining capacity of the battery. The available peripheral device control unit 310 acquires information about the access restricted peripheral devices from the access restricted device table 312 which varies depending on the remaining capacity of the battery 208. In the exemplary embodiment, it is assumed that, for example, when the percentage of the remaining capacity of the battery is 25%, the available peripheral device control unit 310 sets the GPS module 212 and the Wi-Fi module 216 as the access restricted peripheral devices. The available peripheral device control unit 310 then proceeds with the process of S105.

At step S105, the available peripheral device control unit 310 transmits a message to the access control unit 326 indicating that the access restricted peripheral devices are the GPS module 212 and the Wi-Fi module 216 as the information regarding the access restricted peripheral device_ acquired at step S103. The available peripheral device control unit 310 then proceeds with the process of S106.

At step S106, the access grant list control unit 308 receives the name of an application running in the foreground from the application management unit 328. In the present exemplary embodiment, it is assumed that the application A 314 is running in the foreground. The access grant list control unit 308 then proceeds with the process of S107.

At step S107, the access grant list control unit 308 refers to the dependency relationship correspondence table 306 based on the received name of the application running in the foreground. The access grant list control unit 308 acquires the name of an application which depends on the application name received from the table 306. Since the application A 314 is running in the foreground, the access grant list control unit 308 acquires the application A' 316 as the name of an application which depends on the application A 314. The access grant list control unit 308 then proceeds with the process of S108.

At step S108, the access grant list control unit 308 transmits the application names acquired at step S107 to the access control unit 326 as an access grant list. In the present exemplary embodiment, the access grant list control unit 308 transmits the application A 314 and the application A' 316 as the application names. The access grant list control unit 308 then proceeds with the process of S109.

At step S109, the access grant list control unit 308 determines an access request to be granted among the access requests received from the applications based on the information about the access restricted peripheral devices received from the available peripheral device control unit 310 and the access grant list received from the access grant list control unit 308. In the present exemplary embodiment, the access restricted devices are the GPS module 212 and the Wi-Fi module 216, and the application names described in the access grant list are the application A 314 and the application A' 316. Therefore, the application A 314 and the application A' 316 are granted with an access to the GPS module 212 and the Wi-Fi module 216, and applications other than the application A 314 and the application A' 316 are denied the access to the GPS module 212 and the Wi-Fi module 216. The access grant list control unit 308 then proceeds with the process of S110.

At step S110, the access control unit 326 accesses the devices based on the access request determined at step S109. The access control unit 326 then ends a series of process.

Figure 8:
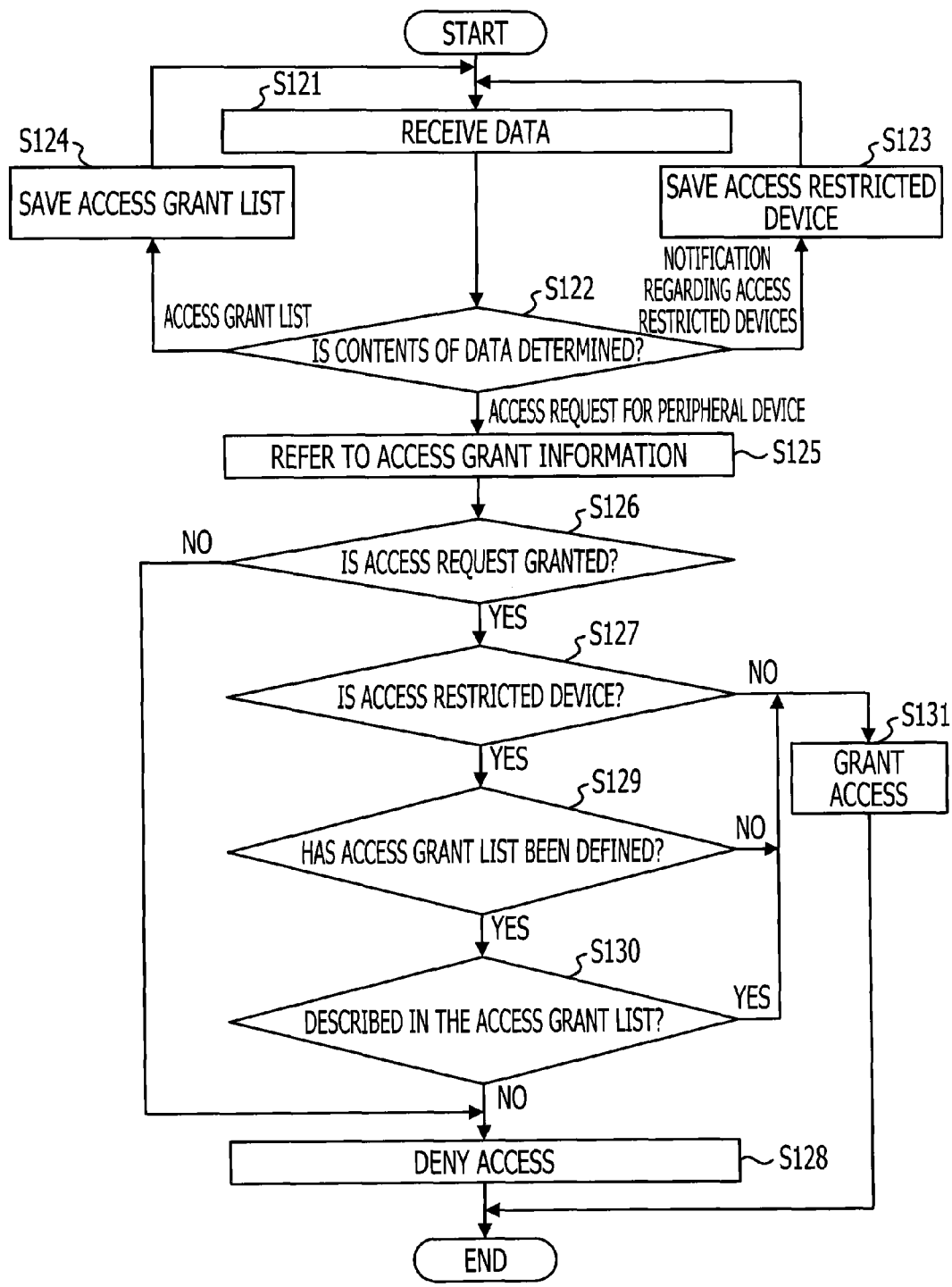
FIG. 8 is a first flowchart illustrating the process of an access control unit.

FIG. 8 is a flowchart illustrating the process of the access control unit. The process of the access control unit 326 is described in detail with reference to FIG. 8.

At step S121, the access control unit 326 receives data. The access control unit 326 then proceeds with the process of S122.

At step S122, the access control unit 326 determines the contents of the received data. When it is determined that the contents of the received data is a notification regarding the access restricted devices sent from the available peripheral device control unit 310, the access control unit 326 proceeds with the process of S123. Further, when it is determined that the contents of the received data is an access grant list from the access grant list control unit 308, the access control unit 326 proceeds with the process of S124. Furthermore, when it is determined that the contents of the received data is an access request for a peripheral device transmitted from an application, the access control unit 326 proceeds with the process of S125.

At step S123, the access control unit 326 saves the access controlled devices. The access control unit 326 then returns to the process of S121.

At step S124, the access control unit 326 saves the access grant list. The access control unit 326 then returns to the process of S121.

At step S125, the access control unit 326 refers to the access grant information of the package information about an application that transmits an access request. The access control unit 326 then proceeds with the process of S126.

At step S126, the access control unit 326, based on the_access grant information referenced at S125, determines whether the access request for a peripheral device transmitted from an application is granted. When it is determined that the access request is granted, the process is proceeded to S127 by the access control unit 326. However, when it is determined that the access request is denied, the access control unit 326 proceeds with the process of S128.

At step S127, the access control unit 326 refers to the access grant list to determine whether the device requested by the requesting application is an access restricted device. When it is determined that the requested device by the application is an access restricted device, the access control unit 326 proceeds with the process of S129. However, when it is determined that the requested device by the application is not an access restricted device, the access control unit 326 proceeds with the process of S131.

At step S129, the access control unit 326 determines whether the access grant list has been defined. When it is determined that the access grant list has been defined, the access control unit 326 proceeds with the process of S130. However, when it is determined that the access grant list has not been defined, the access control unit 326 proceeds with the process of S131.

At step S130, the access control unit 326 determines whether the name of the application requesting an access is described in the access grant list. When it is determined that the name of the application requesting an access is described in the access grant list, the access control unit 326 proceeds with the process of S131. However, when it is determined that the name of the application requesting an access is not described in the access grant list, the access control unit 326 proceeds with the process of S128.

At step S128, the access control unit 326 denies the access requested by the application. The access control unit 326 then ends a series of process.

At step S131, the access control unit 326 grants an access requested by the application. The access control unit 326 then ends a series of process.

According to the present exemplary embodiment, when the remaining capacity of the battery becomes a threshold value or less, the application A 314 and the application A' 316 that are running can access the GPS module 212 and the Wi-Fi module 216, but the application A' 316 that is running cannot access the GPS module 212 and the Wi-Fi module 216. Accordingly, when the remaining capacity of the battery of the information processing apparatus 100 becomes small, only the application described in the access grant list is allowed to access to the access restricted peripheral device. As a result, an application that does not have a dependency relationship with the application running in the foreground becomes unable to access a specific peripheral device, thereby reducing the power consumption by the specific peripheral device.

That is, since the application B' 318 is not allowed to access the GPS module 212, the GPS module 212 will not calculate positional information for the CPU 201 according to a request transmitted from the application B' 318, thereby reducing the power consumption in the CPU 201. Further, since the application B' 318 is not allowed to access the Wi-Fi module 216, the Wi-Fi module 216 will not acquire the positional information according to the request transmitted from the application B' 318, thereby reducing the power consumption in the Wi-Fi module 216. In the meantime, an application running in the foreground and another application that depends on the application running in the foreground are allowed to access the peripheral devices, thereby allowing a user to continue using the application that the user wants to use.

In the meantime, the application B' 318 depends on the application B 320 which provides, for example, positional information of a restaurant. The application B' 318 acquires positional information of the information processing apparatus 100 using the GPS module 212 and acquires movement direction of the information processing apparatus 100 using an acceleration sensor. The application B' 318 then provides the positional information of the restaurant based on the positional information and the moving direction of the information processing apparatus 100.

When the application B' 318 becomes unable to access the GPS module 212, the positional information of the restaurant may be provided based on the moving direction of the information processing apparatus 100 using the positional information of the information processing apparatus 100 acquired shortly before and the acceleration sensor.

Second Exemplary Embodiment

In the present exemplary embodiment, descriptions will be made on a configuration in which the package information of an application program for which an installation is completed is rewritten dynamically to realize an access restriction for the peripheral devices. In the present exemplary embodiment, after making a copy of database in which the package information is stored at the time when the remaining capacity of the battery becomes lower than a threshold value which has been previously registered, the name of the access restricted peripheral device is deleted among the access grant information of the package information. In this case, the package information of a service or an application that depends on the application running in the foreground is excluded from a target of being rewritten by referring to the dependency relationship correspondence table and information about the application program which is currently running in the foreground. Further, when the application program running in the foreground is changed, the access grant information of the application newly running in the foreground is recovered, and at the same time, the access grant information of the application running in the background is rewritten, based on the package information which has been backed-up.

Figure 9:
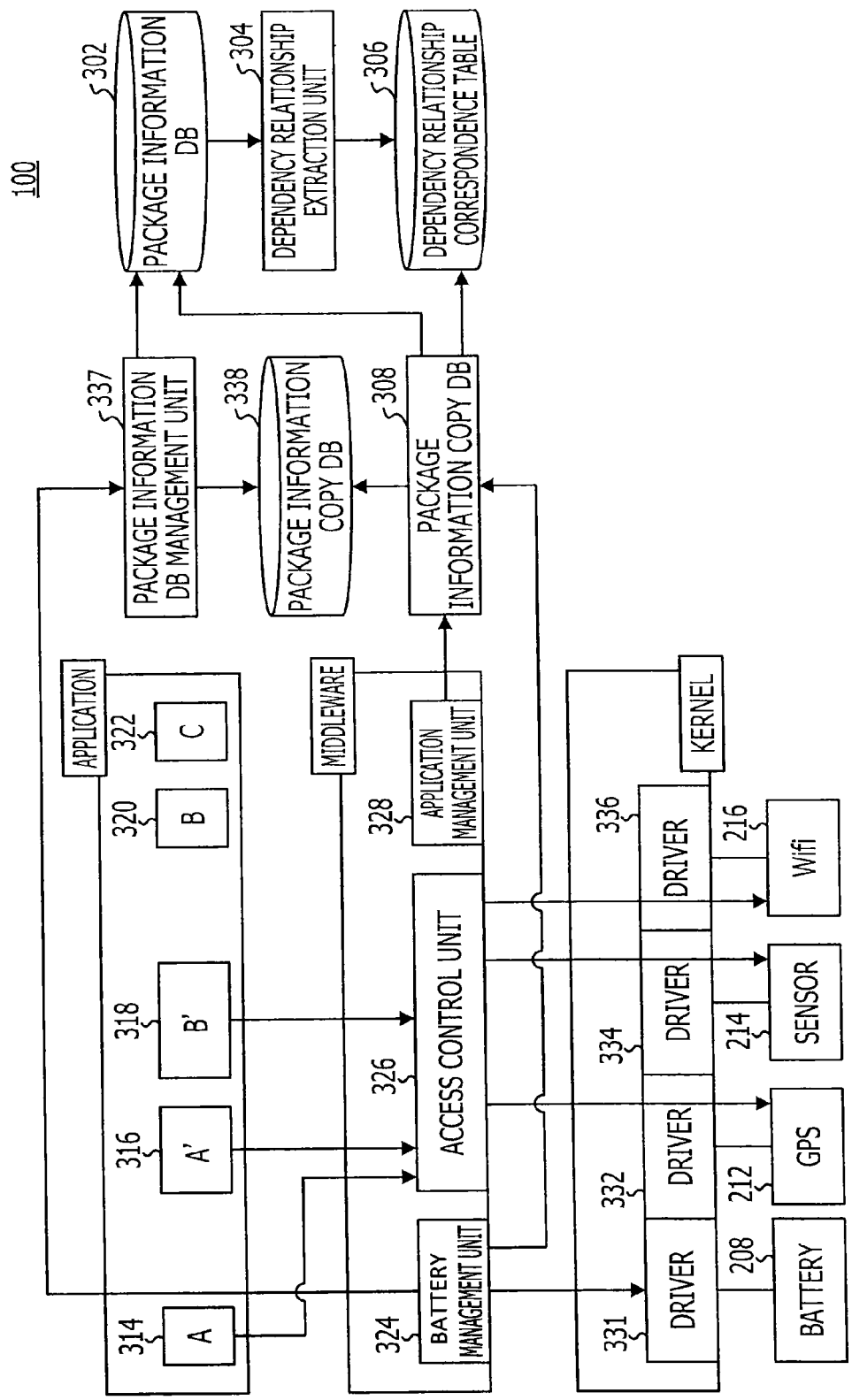
FIG. 9 is a second view illustrating the information processing apparatus.

FIG. 9 is a view illustrating the information processing apparatus of the present exemplary embodiment. The information processing apparatus 100 includes the package information DB 302, the dependency relationship extraction unit 304, the dependency relationship correspondence table 306, the access grant list control unit 308, the application A 314, the application A' 316, the application B' 318, the application B 320, and the application C 322. The information processing apparatus 100 also includes the battery management unit 324, the access control unit 326, the application management unit 328, the drivers 331, 332, 334, 336, the battery 208, the GPS module 212, the sensor 214, the Wi-Fi module 216, the package information DB management unit 337, and the access grant list control unit 308. In the meantime, the same elements as those described with reference to FIG. 2 will be given the same reference numerals, and the description thereof will be omitted.

When it is detected that the remaining capacity of the battery 208 becomes a threshold value or less, the battery management unit 324 notifies the package information DB management unit 337 and an access grant list control unit 308 of the reduction of the remaining capacity of the battery. Further, when it is detected that the remaining capacity of the battery becomes larger than the threshold value, the battery management unit 324 notifies the package information DB management unit 337 and the access grant list control unit 308 of the recovery of the remaining capacity of the battery.

Upon receiving a notification regarding the reduction of the remaining capacity of the battery from the battery management unit 324, the package information DB management unit 337 copies the package information 400 stored in the package information DB 302 and stores the copied package information in the package information copy DB 338.

Figure 10:
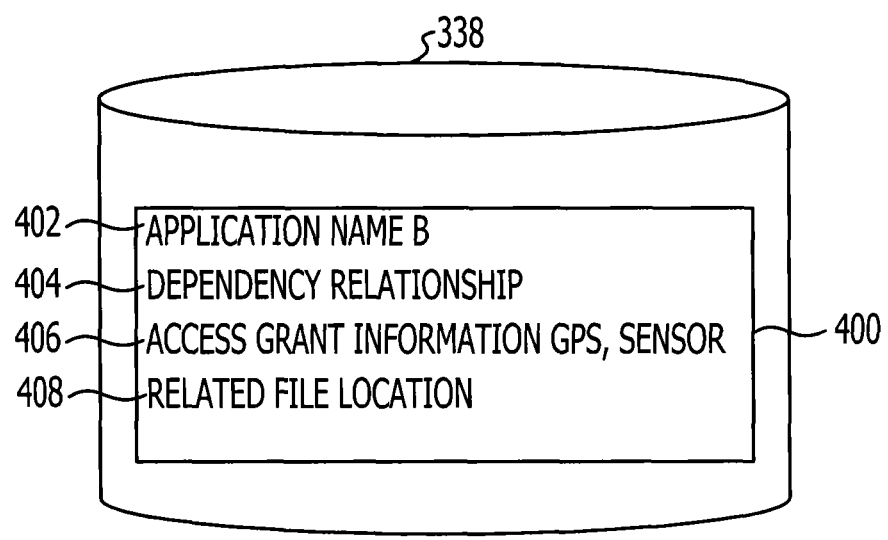
FIG. 10 is a second view illustrating the package information DB.

FIG. 10 is a view illustrating the package information DB 338. The package information DB management unit 337 copies the package information 400 stored in the package information DB 302 and stores the copied package information in the package information copy DB 338.

The access grant list control unit 308 rewrites the package information stored in the package information DB 302 by referring to the access restricted device table 312, based on the name of the application running in the foreground which has been notified from the access management unit 328 and based on the notification received from the battery management unit 324 indicating the reduction of the remaining capacity of the battery.

Figure 11:
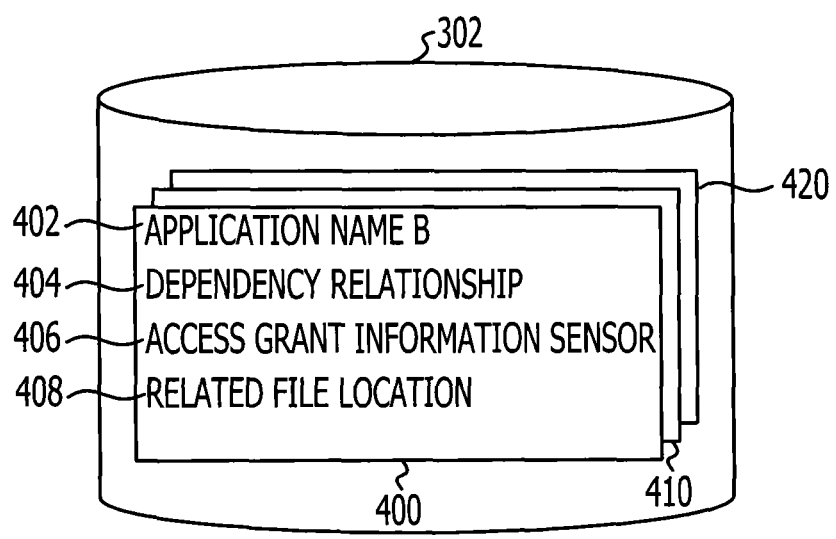
FIG. 11 is a view illustrating a package information copy DB.

FIG. 11 is a view illustrating a package information copy DB. The access grant list control unit 308 determines in advance that the access to the GPS module 21 will be restricted when the remaining capacity of the battery becomes a threshold value or less. Further, when the remaining capacity of the battery becomes a threshold value or less, the access grant list control unit 308 rewrites the package information 400 stored in the package information DB 302 to delete the GPS module from the access grant information 406, and set a sensor as an accessible device. Further, when the application running in the foreground is changed or the remaining capacity of the battery 208 is recovered above the threshold value, the access grant list control unit 308 overwrites the rewritten package information with the package information having been stored in the package information copy DB 338.

The access control unit 326 receives an access request from a running application. The access control unit 326 either grants or denies the access request from the running application by referring to the rewritten package information stored in the package information DB 302.

Figure 12:
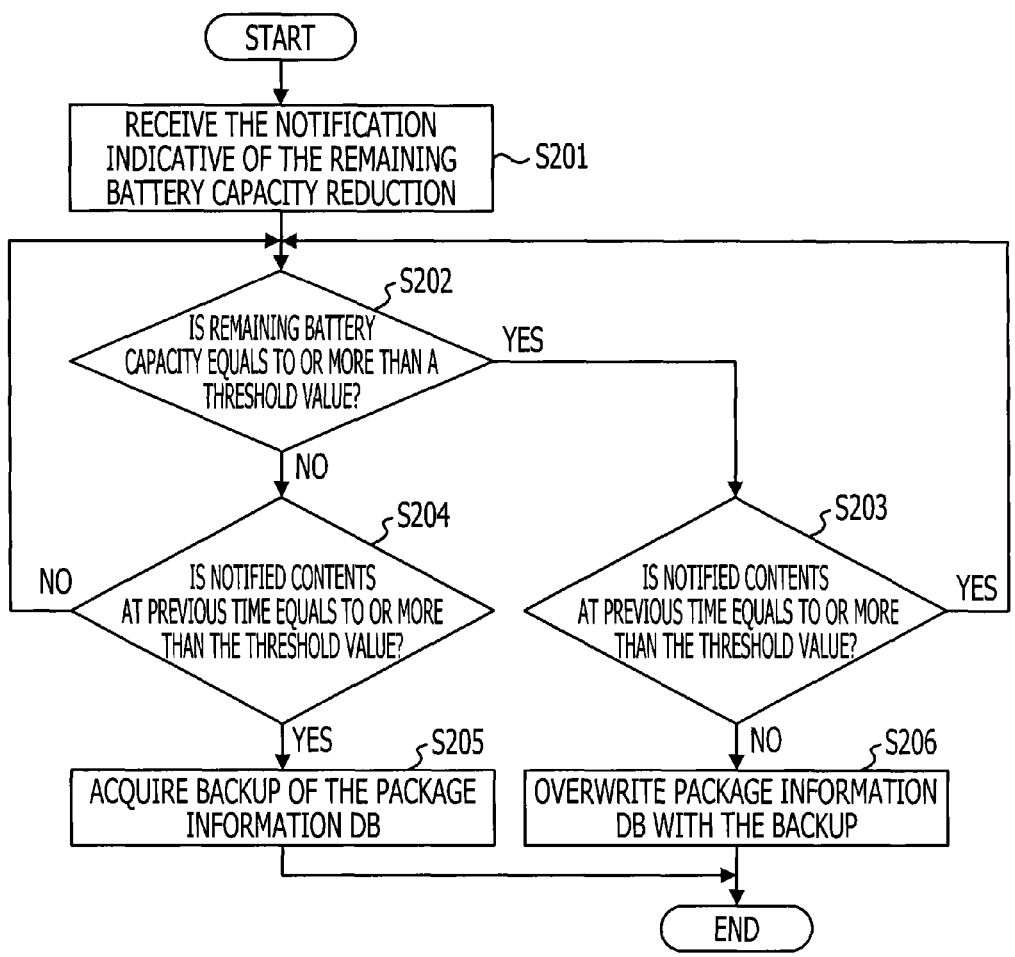
FIG. 12 is a flowchart illustrating the process of a package information DB management unit.

FIG. 12 is a flowchart illustrating the process of a package information DB management unit.

At S201, the package information DB management unit 337 receives a notification from the battery management unit 324 indicating that the remaining capacity of the battery has been reduced. The package information DB management unit 337 then proceeds with the process of S202.

At S202, the package information DB management unit 337 determines whether the remaining capacity of the battery is a threshold value or more. When it is determined that the remaining capacity of the battery is the threshold value or more, the package information DB management unit 337 proceeds with the process of S203. In the meantime, when it is determined that the remaining capacity of the battery is less than the threshold value, the package information DB management unit 337 proceeds with the process of S204.

At S203, the package information DB management unit 337 determines whether the remaining capacity of the battery notified at a previous time is the threshold value or more. When it is determined that the remaining capacity of the battery notified at the previous time is (corresponds to) the threshold value or more, the package information DB management unit 337 returns to the process of S202. When it is determined that the remaining capacity of the battery notified at the previous time is less than the threshold value, the package information DB management unit 337 proceeds with the process of S206.

At S204, the package information DB management unit 337 determines whether the remaining capacity of the battery notified at the previous time is the threshold value or more. When it is determined that the remaining capacity of the battery notified at the previous time is the threshold value or more, the package information DB management unit 337 returns to the process of S205. In the meantime, when it is determined that the remaining capacity of the battery notified at the previous time is less than the threshold value, the package information DB management unit 337 returns to the process of S202.

At S205, the package information DB management unit 337 acquires the backup of the package information stored in the package information DB 302 to store the acquired backup of the package information in the package information copy DB 338. The package information DB management unit 337 then ends a series of process.

At S206, the package information DB management unit 337 overwrites the package information stored in the package information DB 302 with the backup of the package information stored in the package information copy DB 338. The package information DB management unit 337 then ends a series of process.

Figure 13:
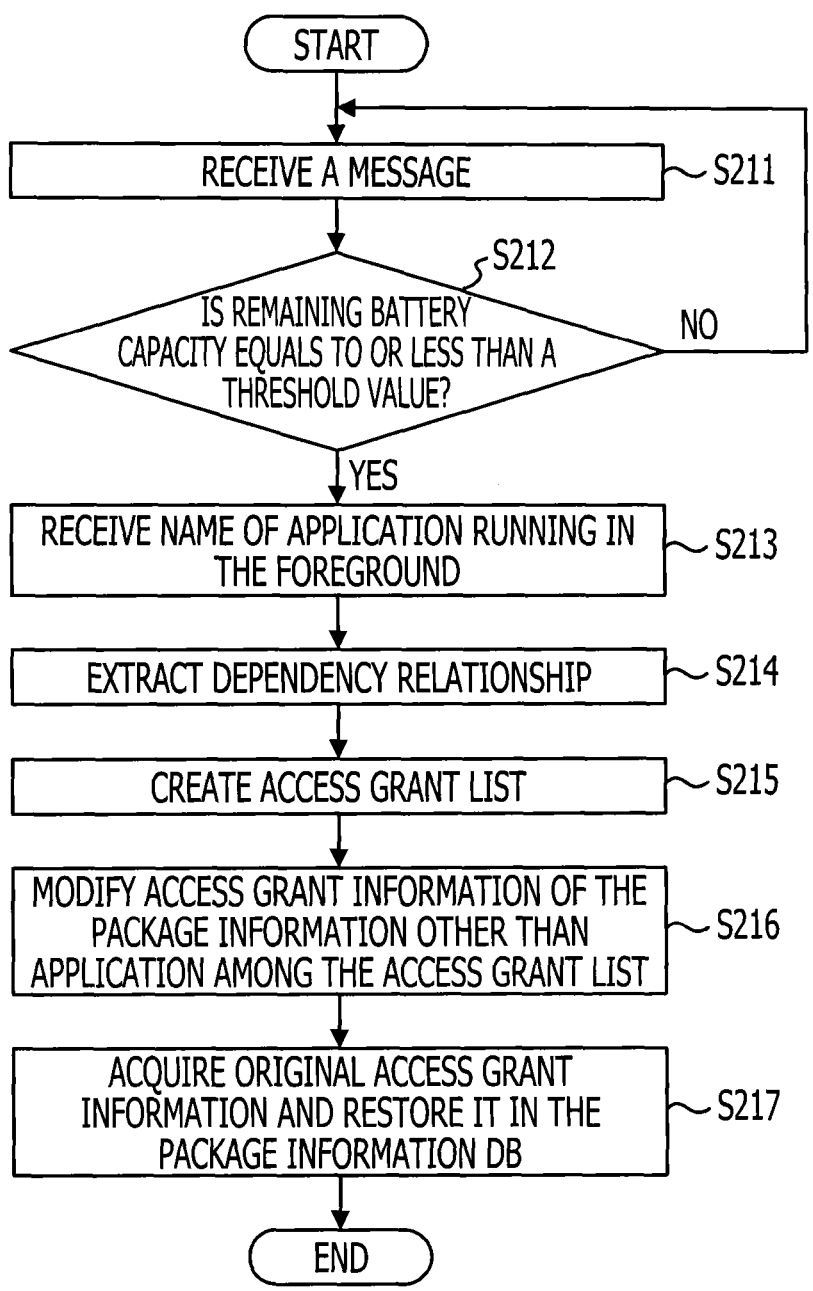
FIG. 13 is a first flowchart illustrating the process of an access grant list control unit.

FIG. 13 is a flowchart illustrating the process of an access grant list control unit.

At S211, the access grant list control unit 308 receives a message. The access grant list control unit 308 then proceeds with the process of S212.

At S212, the access grant list control unit 308 determines whether the remaining capacity of the battery is a threshold value or less. When it is determined that the remaining capacity of the battery is the threshold value or less, the access grant list control unit 308 proceeds with the process of S213. In the meantime, when it is determined that the remaining capacity of the battery is larger than the threshold value, the access grant list control unit 308 returns to the process of S211.

At S213, the access grant list control unit 308 receives the name of an application running in the foreground from the application management unit 328. The access grant list control unit 308 then proceeds with the process of S214.

At S214, the access grant list control unit 308 refers to the package information stored in the package information DB 302 based on the received name of the application running in the foreground and extracts the dependency relationship between the applications. The access grant list control unit 308 then proceeds with the process of S215.

At S215, the access grant list control unit 308 generates an access grant list. The access grant list control unit 308 then proceeds with the process of S216.

At S216, the access grant list control unit 308 modifies the access grant information of the package information other than the application program among the access grant list. The access grant list control unit 308 then proceeds with the process of S217.

At S217, the access grant list control unit 308 acquires the access grant information of an original application program among the access grant list from the package information copy DB 338 and restores the acquired access grant information in the package information DB 302. The access grant list control unit 308 then ends a series of process.

Figure 14:
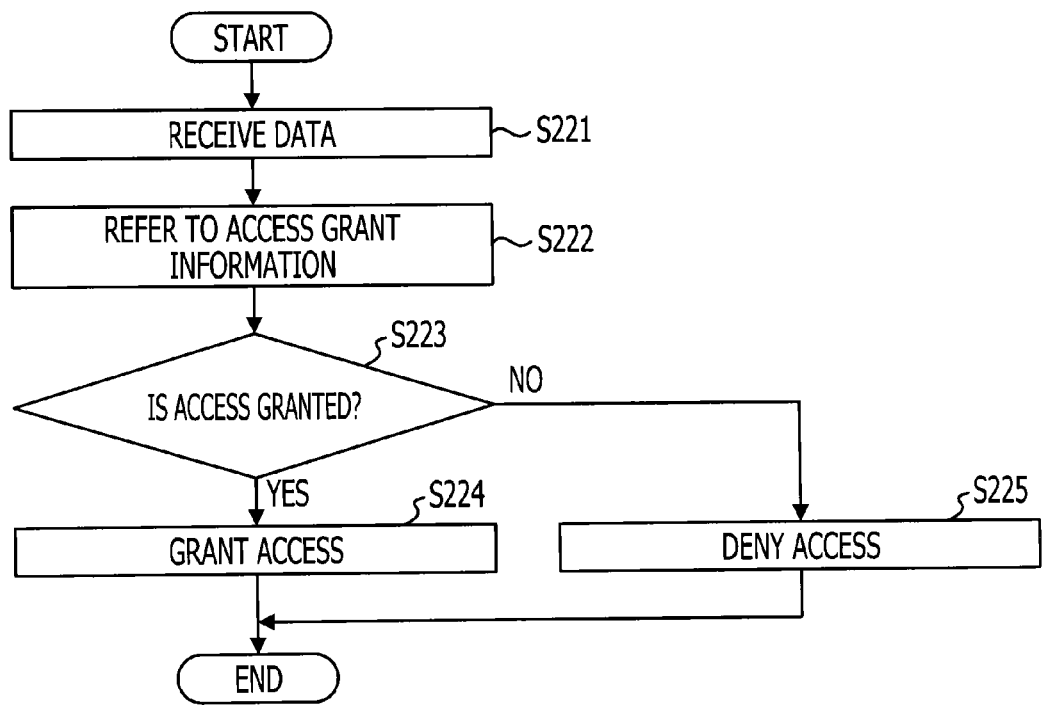
FIG. 14 is a second flowchart illustrating the process of the access control unit.

FIG. 14 is a flowchart illustrating the process of the access control unit.

At S221, the access control unit 326 receives data. The access control unit 326 then proceeds with the process of S222.

At S222, the access control unit 326 refers to the package information DB 302 to acquire the access grant information included in the package information of the application requesting an access. The access control unit 326 then proceeds with the process of S223.

At S223, the access control unit 326 determines whether the application requesting an access has been granted with an access. When it is determined that the application requesting an access is granted with an access, the access control unit 326 proceeds with the process of S224. In the meantime, when it is determined that the application requesting an access is not granted with an access, the access control unit 326 then proceeds with the process of S225.

At S224, the access control unit 326 grants an access to the application requesting an access. The access control unit 326 then ends a series of process.

At S225, the access control unit 326 denies the access request from the application requesting an access. The access control unit 326 then ends a series of process.

Third Exemplary Embodiment

In the present exemplary embodiment, descriptions will be made on a configuration combined with a scheme of changing the access restricted peripheral device in accordance with the remaining capacity of the battery, with respect to the second exemplary embodiment. In the configuration of the present exemplary embodiment, as compared to the second exemplary embodiment, an available peripheral device control unit is added that notifies the access restricted corresponding table and access restricted devices whose accesses have been restricted as a result of the variation of the remaining capacity of the battery.

Figure 15:
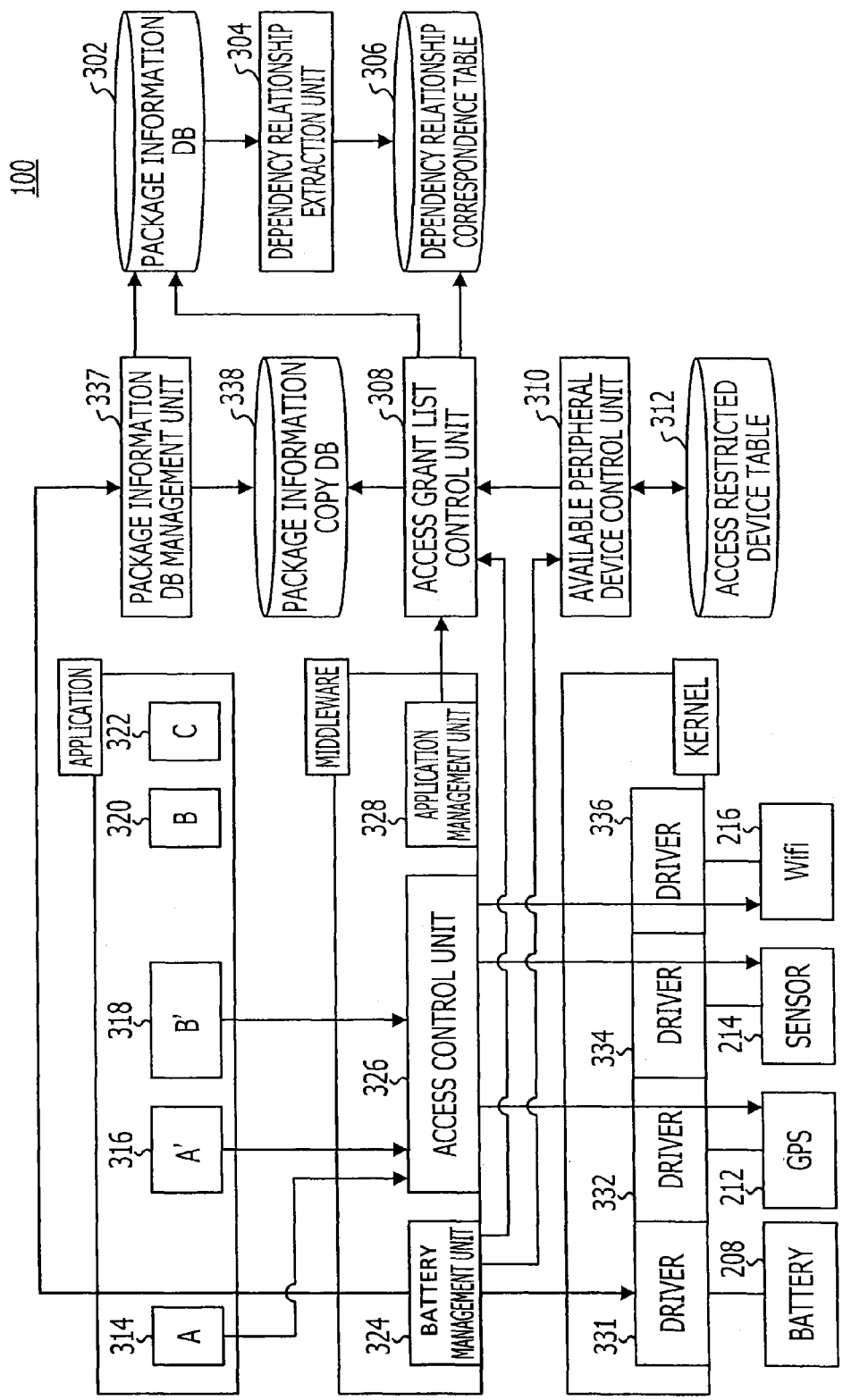
FIG. 15 is a third view illustrating the information process apparatus.

FIG. 15 is a view illustrating the information processing apparatus of the present exemplary embodiment. The information processing apparatus 100 includes the package information DB 302, the dependency relationship extraction unit 304, the dependency relationship correspondence table 306, the access grant list control unit 308, the available peripheral device control unit 310, the access restricted device table 312, the application A 314, the application A' 316, the application B' 318, the application B 320, and the application C 322. The information processing apparatus 100 also includes the battery management unit 324, the access control unit 326, the application management unit 328, the drivers 331, 332, 334, 336, the battery 208, the GPS module 212, the sensor 214, the Wi-Fi module 216, the package information DB management unit 337, and a package information copy DB 338. In the meantime, the same elements as described with reference to FIG. 2 and FIG. 9 will be given the same reference numerals and descriptions thereof will be omitted.

When it is detected that the remaining capacity of the battery 208 becomes a threshold value or less, the battery management unit 324 sends a notification to the package information DB management unit 337, the access grant list control unit 308 and the available peripheral device control unit 310 indicating that the remaining capacity of the battery has been reduced.

Upon receiving a notification from the battery management unit 324 indicating that the remaining capacity of the battery has been reduced, the package information DB management unit 337 copies the package information 400 stored in the package information DB 302 to store the copied package information in the package information copy DB 338. For example, it is assumed that the application A 314 is running in the foreground, the application A' 316 has a dependency relationship with the application A 314, and the percentage of the remaining capacity of the battery is 25%. Then, the access grant list control unit 308 refers to the access restricted device table 312 and determines that the GPS module 212 and the Wi-Fi module 216 are restricted peripheral devices. Accordingly, since the access to the GPS module 212 and the Wi-Fi module 216 from the application B 320 and the application B 318 which has a dependency relationship with the application B 320 is denied, the access grant list control unit 308 rewrites the package information 400 stored in the package information DB 302 to delete the GPS module from the access grant information 406, and set a sensor as an access granted device. Further, when the application running in the foreground is changed or the remaining capacity of the battery is recovered to an amount larger than a threshold value, access grant list control unit 308 overwrites the rewritten package information with the package information stored in the package information copy DB 338.

Figure 16:
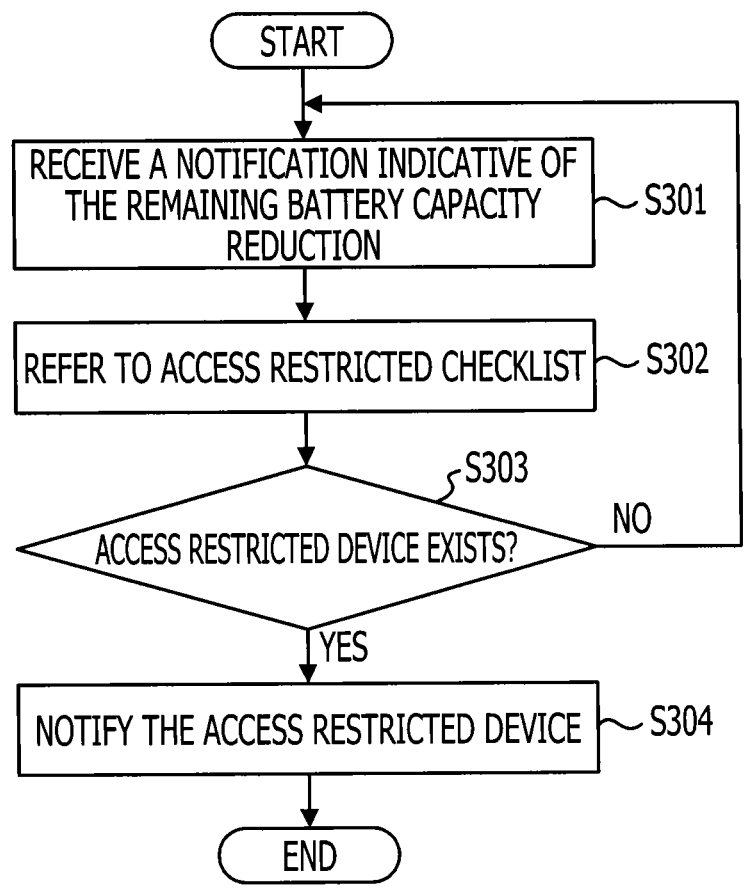
FIG. 16 is a first flowchart illustrating the process of an available peripheral device control unit.

FIG. 16 is a flowchart illustrating a process of an available peripheral device control unit.

At S301, the available peripheral device control unit 310 receives a notification from the battery management unit 324 indicating that the remaining capacity of the battery has been reduced. The available peripheral device control unit 310 then proceeds with the process of S302.

At S302, the available peripheral device control unit 310 refers to the entry that corresponds to the remaining capacity of the battery from the access restricted comparison table 312. The available peripheral device control unit 310 then proceeds with the process of S303.

At S303, the available peripheral device control unit 310 refers to the access restricted comparison table 312 to determine whether an access restricted device exists. When it is determined that the access restricted device exists, the available peripheral device control unit 310 proceeds with the process of S304. In the meantime, when it is determined that the access restricted device does not exist, the available peripheral device control unit 310 returns to the process of S301.

At S304, the available peripheral device control unit 310 notifies the access grant list control unit of the access restricted device. The available peripheral device control unit 310 then ends a series of process.

Figure 17:
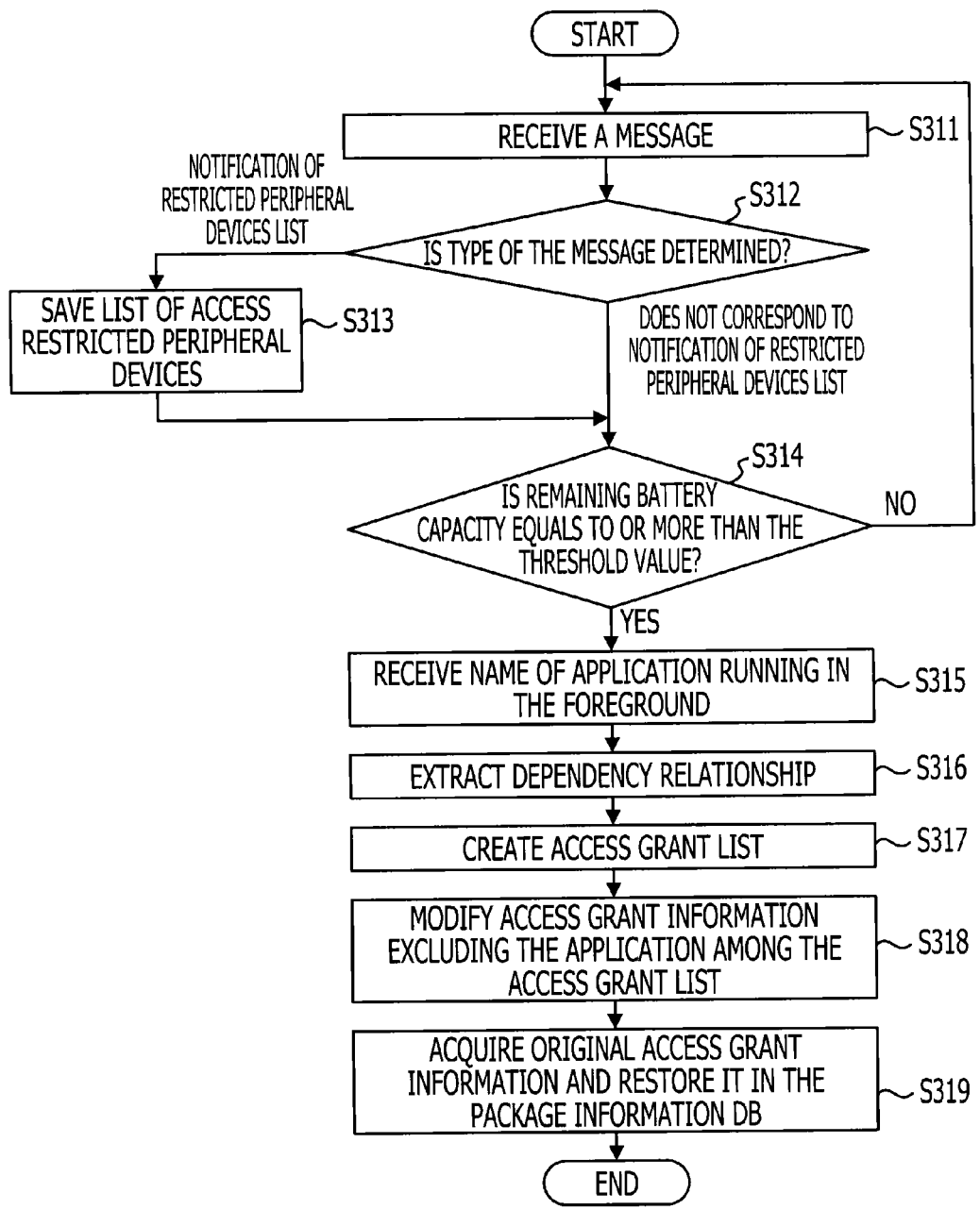
FIG. 17 is a second flowchart illustrating the process of the access grant list control unit.

FIG. 17 is a flowchart illustrating the process of the access grant list control unit.

At step S311, the access grant list control unit 308 receives a message. The access grant list control unit 308 then proceeds with the process of S312.

At step S312, the access grant list control unit 308 determines the type of the received message. When it is determined that the type of the received message corresponds to a notification of the restricted peripheral devices list, the access grant list control unit 308 proceeds with the process of S313. In the meantime, when it is determined that the type of the received message does not correspond to a notification of the restricted peripheral devices list, the access grant list control unit 308 proceeds with the process of S314.

At step S313, the access grant list control unit 308 saves the list of the restricted peripheral devices. The access grant list control unit 308 then proceeds with the process of S314.

At step S314, the access grant list control unit 308 determines whether the remaining capacity of the battery 208 is a threshold value or more. When it is determined that the remaining capacity of the battery 208 is the threshold value or more, the access grant list control unit 308 proceeds with the process of S315. In the meantime, when it is determined that the remaining capacity of the battery 208 is less than the threshold value, the access grant list control unit 308 returns to the process of S311.

At S315, the access grant list control unit 308 receives the name of an application running in the foreground from the application management unit 328. The access grant list control unit 308 then proceeds with the process of S316.

At S316, the access grant list control unit 308 refers to the package information stored in the package information DB 302 to extract the dependency relationship between the applications, based on the received name of an application running in the foreground. The access grant list control unit 308 then proceeds with the process of S317.

At S317, the access grant list control unit 308 generates an access grant list. The access grant list control unit 308 then proceeds with the process of S318.

At S318, the access grant list control unit 308 modifies the access grant information excluding the application program of the package information among the access grant list. The access grant list control unit 308 then proceeds with the process of S319.

At S319, the access grant list control unit 308 acquires the access grant information of an original application program among the access grant list from the package information copy DB 338 and restores the acquired access grant information in the package information DB 302. The access grant list control unit 308 then ends a series of process.

Figure 18:
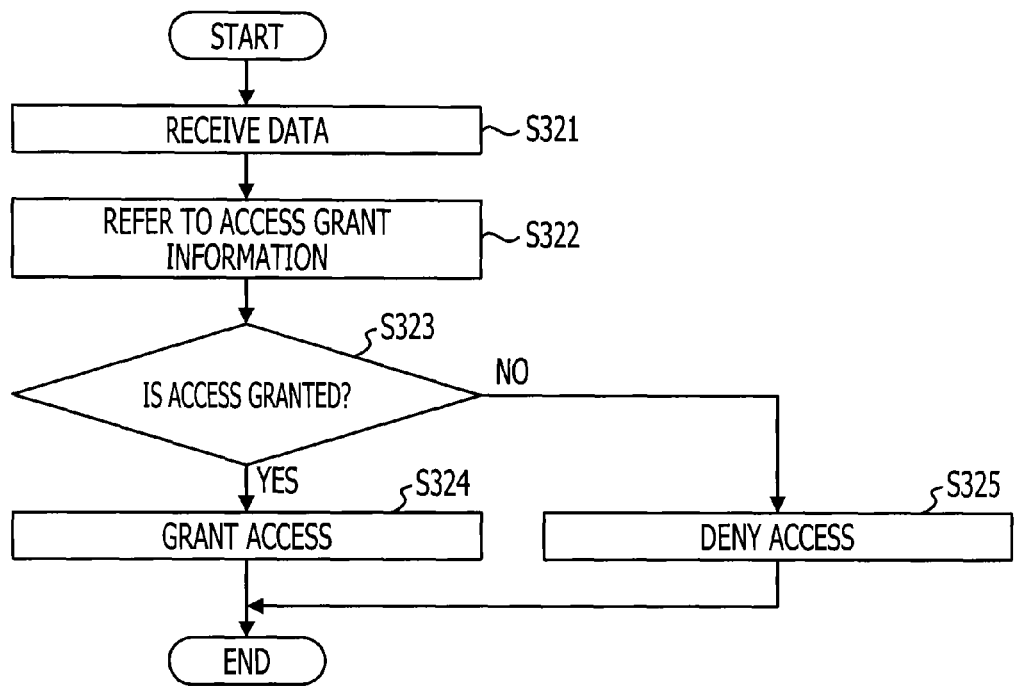
FIG. 18 is a third flowchart illustrating the process of the access control unit.

FIG. 18 is a flowchart illustrating the process of the access control unit.

At S321, the access control unit 326 receives data. The access control unit 326 then proceeds with the process of S322.

At S322, the access control unit 326 refers to the package information DB 302 for the access grant information of the package information about an application requesting an access. The access control unit 326 then proceeds with the process of S323.

At S323, the access control unit 326 determines whether an application requesting an access is granted with an access. When it is determined that the application requesting an access is granted with an access, the access control unit 326 proceeds with the process of S324. In the meantime, when it is determined that the application requesting an access is not granted with an access, the access control unit 326 proceeds with the process of S325.

At S324, the access control unit 326 grants an access to the application requesting an access. The access control unit 326 then ends a series of process.

At S325, the access control unit 326 denies the access to the application requesting an access. The access control unit 326 then ends a series of process.

As described above, according to the present exemplary embodiment, an application being manipulated interactively by a user, and a service associated with the manipulated application or other application is allowed to use the peripheral devices when the remaining capacity of the battery is reduced. As a result, even when the remaining capacity of the battery is reduced, for example, the navigation application may be used in a normal way. Additionally, when, for example, a data communication is performed wirelessly, the wireless device consumes more power during transmitting and receiving signals as compared to a standby state. As a result, the access to the wireless device may be limited to the application being manipulated by a user to make it possible to suppress the power consumption. Therefore, power consumption of the entire portable terminal device may be reduced while still maintaining a user convenience, thereby enabling an extension of the battery life.

As described above, descriptions have been made for an information processing apparatus of the exemplary embodiments of the present disclosure, but the present disclosure is not limited to the embodiments described in detail, and various modifications and changes may be made without departing from the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An information processing apparatus comprising:
a memory; and
a processor coupled to the memory, configured to execute a process including:
    acquiring control information of a first application program of which execution result is displayed,
    extracting a dependency relationship between the first application program and a second application program on a basis of the control information,
    acquiring a remaining capacity of a power source;
    acquiring device information corresponding to the remaining capacity of the power source; and
    determining whether an access request for a device corresponding to the device information from the second application program is granted on a basis of the dependency relationship.

2. The information processing apparatus according to claim 1, wherein the process further includes:
granting an access request for the device from the second application program having dependency relationship with the first application program.

3. The information processing apparatus according to claim 1, wherein the process further includes:
denying an access request for the device from a third application program other than the first application program and the second application program.

4. A control method of an information processing apparatus, the method comprising:
acquiring control information of an application program of which execution result is displayed,
extracting a dependency relationship between the application program and another application program on a basis of the control information,
acquiring a remaining capacity of a power source;
acquiring device information corresponding to the remaining capacity of the power source; and
determining, by a processor, whether an access request for a device corresponding to the device information from the other application program is granted on a basis of the dependency relationship.

5. A computer-readable storage medium that stores a control program causing a processor to execute a process including:
acquiring control information of an application program of which execution result is displayed,
extracting a dependency relationship between the application program and another application program on a basis of the control information,
acquiring a remaining capacity of a power source;
acquiring device information corresponding to the remaining capacity of the power source; and
determining whether an access request for a device corresponding to the device information from the other application program is granted on a basis of the dependency relationship.

6. The control method according to claim 4, further comprising:
granting an access request for the device from the second application program having dependency relationship with the first application program.

7. The control method according to claim 4, further comprising:
denying an access request for the device from a third application program other than the first application program and the second application program.

8. The control method according to claim 4, further comprising:
rewriting control information of a third application program other than the first application program and the second application program when the remaining capacity of the power source becomes a given value or less.

9. The computer-readable storage medium according to claim 5, wherein the process further includes:
granting an access request for the device from the second application program having dependency relationship with the first application program.

10. The computer-readable storage medium according to claim 5, wherein the process further includes:
denying an access request for the device from a third application program other than the first application program and the second application program.

11. The computer-readable storage medium according to claim 5, wherein the process further includes:
rewriting control information of a third application program other than the first application program and the second application program when the remaining capacity of the power source becomes a given value or less.

12. The information processing apparatus according to claim 1, wherein the process further includes:
rewriting control information of a third application program other than the first application program and the second application program when the remaining capacity of the power source becomes a given value or less.

* * * * *